US009715039B2

(12) United States Patent
Martínez De La Escalera et al.

(10) Patent No.: US 9,715,039 B2
(45) Date of Patent: Jul. 25, 2017

(54) APPARATUS AND SYSTEM FOR SMART SEEDING WITHIN CLOUD FORMATIONS

(71) Applicants: Lorenzo Martinez Martínez De La Escalera, Polanco Delegación Miguel Hidalgo (MX); Jorge Joaquin Canto Ibanez, Tlalpan (MX); Diego Martinez Martínez De La Escalera, México Distrito Federal (MX); Hernán Rivera Ramos, México Distrito Federal Delegación Benito Juárez (MX); Lorenzo Martinez Gomez, Col. Vista Hermosa en Cuernavaca Morelos (MX)

(72) Inventors: Lorenzo Martinez Martínez De La Escalera, Polanco Delegación Miguel Hidalgo (MX); Jorge Joaquin Canto Ibanez, Tlalpan (MX); Diego Martinez Martínez De La Escalera, México Distrito Federal (MX); Hernán Rivera Ramos, México Distrito Federal Delegación Benito Juárez (MX); Lorenzo Martinez Gomez, Col. Vista Hermosa en Cuernavaca Morelos (MX)

( * ) Notice: Subject to any disclaimer, the term of this patent is extended or adjusted under 35 U.S.C. 154(b) by 12 days.

(21) Appl. No.: 14/685,241

(22) Filed: Apr. 13, 2015

(65) Prior Publication Data

US 2016/0299254 A1 Oct. 13, 2016

(51) Int. Cl.
*G01W 1/00* (2006.01)
*G01W 1/08* (2006.01)
(Continued)

(52) U.S. Cl.
CPC ............... *G01W 1/08* (2013.01); *A01G 15/00* (2013.01); *B64C 39/024* (2013.01); *B64C 2201/125* (2013.01)

(58) Field of Classification Search
None
See application file for complete search history.

(56) References Cited

U.S. PATENT DOCUMENTS 5,628,455 A * 5/1997 Fukuta .................... E01H 13/00 239/2.1
6,056,203 A * 5/2000 Fukuta .................... A01G 15/00 239/14.1

(Continued)

*Primary Examiner* — Peter Macchiarolo
*Assistant Examiner* — Jermaine Jenkins
(74) *Attorney, Agent, or Firm* — Polsinelli PC

(57) ABSTRACT

This invention consists of a unique apparatus and system consisting of devices, materials and methods specially engineered to perform high precision and smart cloud seeding by the dispersion of micro and nanoparticles of sodium chloride and similar chemistry compounds at specific locations with the purpose of rain induction and related applications. A safe and precise unmanned aerial vehicle UAV device instrumented with portable thermometer, hygrometer, barometer, anemometer and 3D visual register will scrutinize these internal cloud climate parameters. By means of these real time measurements and communications, a meteorological ground operating team is enabled to perform the data acquisition and processing from the clouds. This device and system be enabled to select the locations suitable for rain induction and perform on site accurate particulate seeding dispersion from a device mounted on the same UAV within the eligible clouds. Typical applications of this apparatus and system besides rain induction are fog condensation for airports, highways and other environments where visibility impairment may have critical consequences. This invention may also provide a valuable tool to provide solutions to control and mitigate snow, sleet and hail effects.

7 Claims, 5 Drawing Sheets

(51) Int. Cl.

| | |
|---|---|
| ***A01G 15/00*** | (2006.01) |
| ***B64C 39/02*** | (2006.01) |

(56) References Cited

U.S. PATENT DOCUMENTS

| | | | | |
|---|---|---|---|---|
| 7,319,039 | B2 * | 1/2008 | Sullivan | G01N 21/6428 250/458.1 |
| 9,349,148 | B2 * | 5/2016 | Sirota | G06Q 50/02 |
| 2015/0247835 | A1 * | 9/2015 | Trovat | G01N 33/24 702/2 |
| 2016/0165813 | A1 * | 6/2016 | Wilkins | A01G 15/00 239/2.1 |

* cited by examiner

APPARATUS AND SYSTEM FOR SMART SEEDING WITHIN CLOUD FORMATIONS

TECHNICAL FIELD

This invention consists of an apparatus and system aimed to make a significant enhancement of the current cloud seeding and rain inducing technologies in the fields of safety, efficacy and reproducibility.

BACKGROUND OF THE INVENTION

The US Patent Office has granted patents related to rain formation and induction spreading along nearly the previous 100 years. In 1920 U.S. Pat. No. 1,338,343 was granted for the process and apparatus for the production of intense artificial clouds, fogs, or mists.

Aviation developments triggered inventions related to the formation of clouds since 1927 as well as the instrumentation of airplanes for the dispersion of many types of powders including those of agricultural interest. Among these are the U.S. Pat. No. 1,619,183-1927, 892,132-1932, 195,707-1934, U.S. Pat. No. 2,480,967-1949, U.S. Pat. No. 2,510,867-1951, U.S. Pat. No. 2,582,678-1952, U.S. Pat. No. 3,126,155-1964, U.S. Pat. No. 3,429,507-1969, U.S. Pat. No. 3,456,880-1969, U.S. Pat. No. 3,313,487-1967, U.S. Pat. No. 4,948,050-1990, U.S. Pat. No. 5,174,498-1992, U.S. Pat. No. 5,104,069-1992 or 6,056,203-2000.

Other inventions involve cloud seeding employing bullets, pyrotechnics, missiles and rockets from aircraft or ground into the clouds such as U.S. Pat. No. 2,963,975-1960, U.S. Pat. No. 3,813,875-1974, U.S. Pat. No. 4,096,005-1978, U.S. Pat. No. 5,357,865-1994, U.S. Pat. No. 3,441,214-1969, U.S. Pat. No. 3,677,840-1972, U.S. Pat. No. 4,600,147-1986 or U.S. Pat. No. 4,653,690-1987.

Some inventions involve satellite approaches such as U.S. Pat. No. 4,402,480-1983 or U.S. Pat. No. 5,984,239-1999. There are inventions specific to develop seeding gases, liquids and solids of specific sizes and microstructures such as U.S. Pat. No. 3,127,107-1964, U.S. Pat. No. 3,630,950-1971 or U.S. Pat. No. 4,129,252-1978. There are inventions for cloud seeding from air or ground facilities aimed to induce or mitigate rain, hail, fog or sleet such as the U.S. Pat. No. 1,665,267-1928, U.S. Pat. No. 2,908,442-1959, U.S. Pat. No. 3,545,677-1970, U.S. Pat. No. 3,601,312-1971, U.S. Pat. No. 3,835,059-1974, U.S. Pat. No. 3,896,993-1975, U.S. Pat. No. 3,940,059-1976 or U.S. Pat. No. 5,628,455-1997.

Cloud seeding has been practiced for many years around the globe. Scientific articles have reported cloud seeding experiences in USA, Israel, China, South Africa, Argentina, and other countries as referenced below. In general the successes of cloud seeding have been documented as statistical differences in rain probability, rather than direct cause effect measurements.

Cloud seeding is now considered a potentially very valuable tool to improve rain precipitation. Research progress has produced encouraging results that will eventually make cloud seeding a practical technique to overcome draught by programmable rain induction and to develop water supply for many regions. Although the efficacy of cloud seeding is currently a matter of academic discussions, many countries have launched significant resources and efforts in direct cloud seeding. Regardless there are not yet reports of a proven or reproducible direct cause effect of cloud seeding and precipitation, claims of successful correlations sustain the international efforts.

Nimbus stratus or nimbus cumulus clouds are the ones that produce rain, snow, sleet or hail. Since nimbus clouds are dense with water, they appear darker than other clouds. Nimbus clouds are formed at low altitudes and are typically spread uniformly across the sky.

The seeder-feeder mechanism is a well characterized and singular rain induction process where the relevance of the present invention is significant. The seeder-feeder mechanism typically occurs when a double layer of clouds, one above the other leaving a space about 500 m to 1,500 m of air as described in FIG. 1.

The seeder-feeder mechanism is defined as the introduction of ice or condensed water nuclei from above into a lower level liquid cloud. The introduction of condensation nuclei can initiate precipitation from the low-level cloud layer. As condensation nuclei are introduced into the lower liquid cloud, the ice crystals or condensates can grow by deposition, which can cause the low cloud to precipitate. There are features in the observed soundings and surface observations that can alert a forecaster to the potential for the seeder-feeder process to occur within 12 hours.

In a seeder-feeder type of cloud system nuclei can be formed in the upper cloud can occur around air dust particles made of kaolinite/clay, volcanic ash/dust or vermiculite. Nuclei can also be formed by artificially dispersed silver iodide, potassium chloride, plain salt or other compounds. Properly dispersed particles in the micro and nanoscale ranges can efficiently seed cloud nuclei by using as little as 500 g per square kilometer.

The resulting precipitation by a seeder-feeder mechanism is very dependent upon the proper characterization of all the atmospheric parameters as well as the spatial variables such as upper and lower cloud thickness and the air gap in between. The temperature, pressure, wind and humidity distributions within the clouds, in the air gap, as well as the corresponding surface variables.

The present invention is a precise and reproducible tool for smart cloud seeding. As it is hereby described consists of an apparatus and system and method to assist in effectively induction of rain form cloud formations by implanting particulate compounds in optimized cloud sites of accurately measured specific meteorological parameters.

Typically the current state of the art rain induction technologies involve poor decision making based on long distance and low precision atmospheric parameter measurements, low accuracy procedures and coarse and/or unsafe seeder dispersion practices.

For example China has practiced rain induction (or hail prevention) by the launching of ground to cloud rockets. Explosive charges were sent using missiles to disperse seeder materials, where the decision making was made also from long distance ground to cloud measurements, or simply from visual appreciations such as cloud morphology aided by atmospheric parameters at ground.

Other approaches involve airplane flights into the clouds, or dispersion of sub-sized particles floating from ground stations all the way into the clouds.

OBJECTIVE OF THE INVENTION

This invention has the objective to produce a breakthrough aimed to overcome the efficacy limitations, risks, environmental impact and high costs associated to the presently uncertain rain induction technologies. So far the literature reports involve statistical data resulting from seeder materials dispersion experiments followed by rain measurements showing very limited correlation factors. This invention provides solutions to overcome many of the limitations of the current rain inducing technologies where the results so far are limited to weak statistical cause effect correlations as are present in the existent scientific and technical literature.

This invention consists of an apparatus and system based on the integration of a set of devices, materials and methods with the objective to assist in the engineering of the induction of rain in specific sites of cloud formations. This invention is a valuable tool to accurate positioning within a specific cloud system dispersions of particulates of sodium chloride, silver iodide and/or similar chemistry compounds to induce the formation of liquid or solid water droplets which will ultimately cause precipitation of rain, hail, snow or sleet.

An array of instruments described below will be mounted on a UAV device to be described below with the objective to perform at specific cloud locations of highly favorable thermal, humidity, barometric pressure, visual 3D register and water droplet overall physical conditions as determined by the set of such instruments within the clouds at will and thus providing real time meteorological information at the exact site.

The invention of an apparatus and system consisting of devices, materials, methods and a ground data server facility with the objective of developing a tool aimed to be a powerful tool to enable scientists and engineers to gather real time data an site for the better understanding of the science and technology of cloud physics specially oriented to control the phenomena associated to rain, hail, snow or sleet.

The development of a set of instrumentation with the objective to accumulate big quantities of physical data regarding integrating field experience of on site cloud physics measurements and 3D visual register.

The applications of this invention with the objective to help the mitigation of fog condensation for airports, highways and other environments where visibility impairment may have critical consequences.

The applications of this invention with the objective to provide solutions to control and mitigate rain, snow, sleet and hail phenomena.

ABSTRACT OF THE DISCLOSURE

The present invention does not invade the fields of knowledge of the patents cited below. The present invention involves apparatus and systems aimed to provide safe unmanned air operations, precision real time atmospheric measurements followed by smart decision mechanisms leading to very accurate on site cloud seeding which were not available in the past decades.

Typically the current state of the art rain induction technologies involve poor decision making based on long distance and low precision atmospheric parameter measurements, low accuracy procedures and coarse and/or unsafe seeder dispersion practices. For example China has practiced rain induction (or hail prevention) by the launching of ground to cloud rockets. Explosive charges were sent using missiles to disperse seeder materials, where the decision making was made also from long distance ground to cloud measurements, or simply from visual appreciations such as cloud morphology aided by atmospheric parameters at ground. Other approaches involve airplane flights into the clouds, or dispersion of sub-sized particles floating from ground stations all the way into the clouds.

This invention integrates of a set of devices, materials and methods which will enable engineers with a precision tool for the induction of rain from cloud formations by the dispersion of particulates of sodium chloride, silver iodide and/or other similar chemistry compounds at specific locations. An unmanned aerial vehicle UAV device instrumented with portable thermometer, hygrometer, barometer, anemometer and 3D visual register will monitor these cloud parameters at the clouds interior in real time and communicate with a meteorological ground operating base. The invention is aimed to enable engineers or technicians to maximize efficacy of the rain induction at cloud systems where artificial powders can be dispersed. A special case where the present invention will be valuable is to produce maximum efficacy is the seeder-feeder mechanism in double layer cloud systems as a likely candidate.

DETAILED DESCRIPTION OF THE INVENTION

Figure 1:
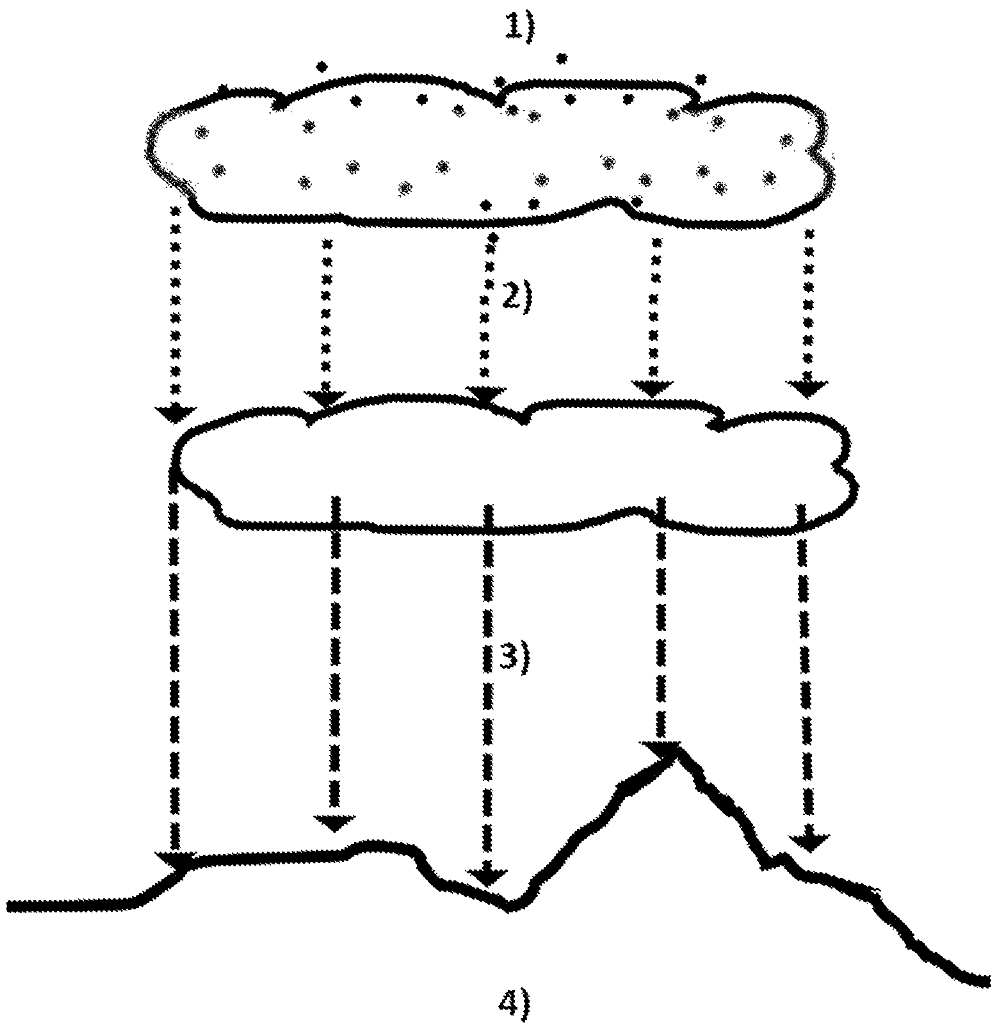
FIG. 1. Seeder-feeder mechanism cloud system. 1) Particulate seeding. 2) Ice or liquid nuclei precipitation. 3) Rain, hail, snow or sleet. 4) Ground. A well known physical phenomena associated to rain induction is the seeder-feeder mechanism which occurs in double deck cloud formations having an air layer in between. In the cloud positioned above rain nuclei, either ice or liquid water can be formed by hygroscopic coalescence around natural or artificial particulates. These nuclei will precipitate over the lower cloud inducing rain, snow, hail or sleet. Rain induced by seeding can occur in cloud formations other than the double deck seeder-feeder mechanism.
Figure 2:
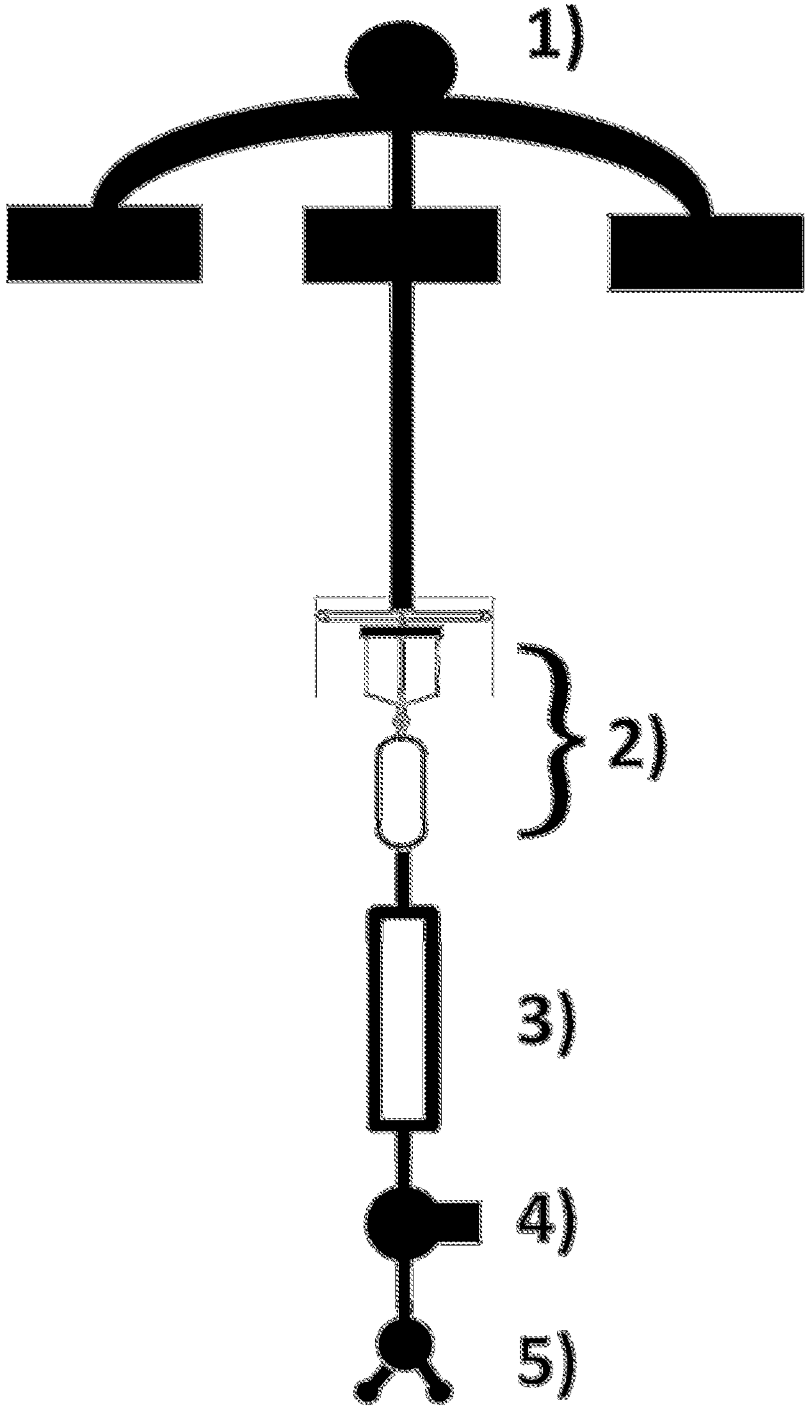
FIG. 2. Configuration of the aerial set of UAV (1); particulate seeder dispersion device (2), data acquisition and control instrumentation station (3) and anemometer (4).
Figure 3:
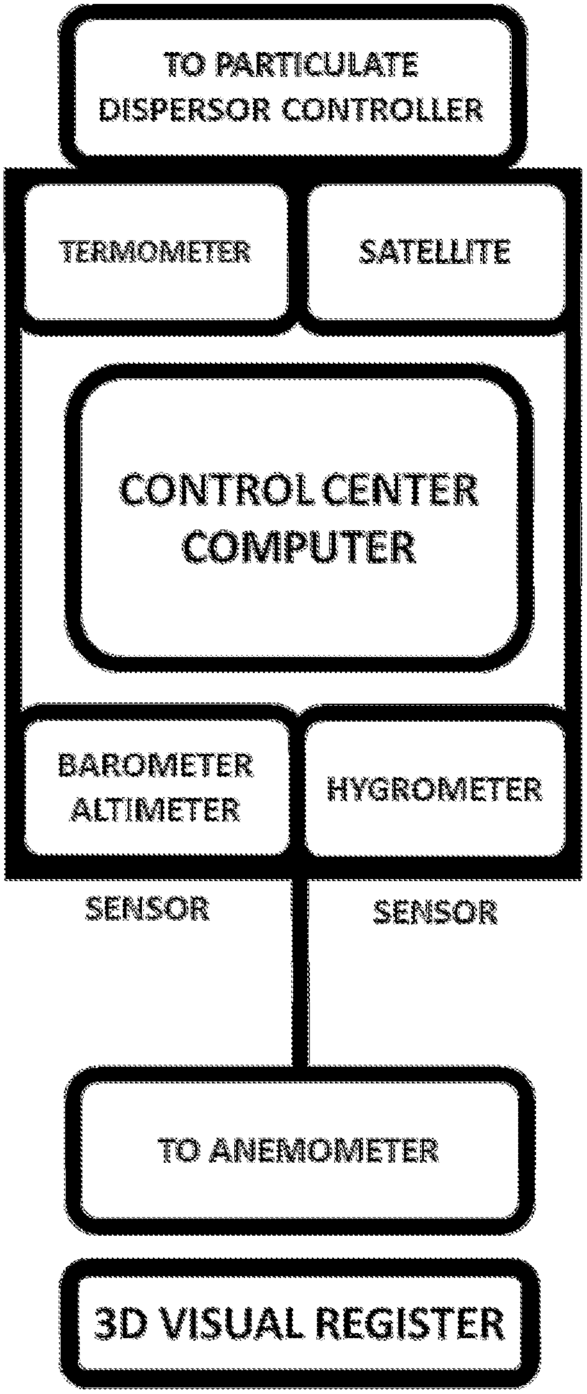
FIG. 3. Data acquisition and control system and instrumentation station including thermometer, hygrometer, barometer and controllers for anemometer and particulate dispersion device.
Figure 4:
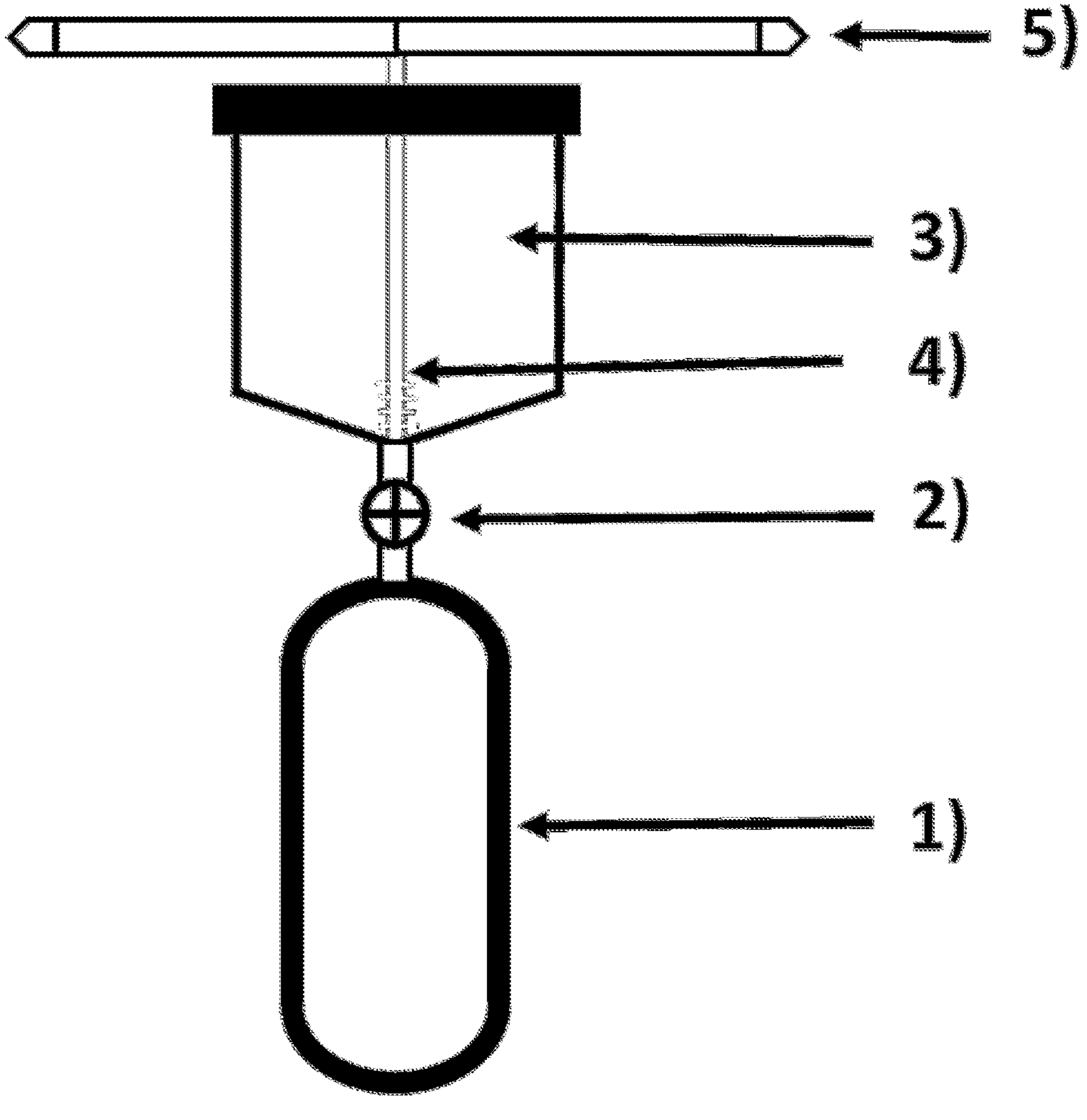
FIG. 4. Particulate seeder dispersion device. This device is composed by a (1) compressed gas tank, (2) a control valve, (3) container for the particulates, (4) a particulate and gas raiser tube and a (5) dispersion nozzles.

This invention consists of an apparatus and system made of a unique set of devices, materials and methods specially engineered to perform high precision induction of rain within cloud formations by the dispersion of particulates of sodium chloride and similar chemistry compounds at specific locations. A safe and precise unmanned aerial vehicle UAV device instrumented with portable thermometer, hygrometer, barometer, anemometer and 3D register which will scrutinize these internal cloud climate parameters. By means of these real time measurements and communications, a meteorology skilled ground operating team will perform the data acquisition and processing from the clouds. Employing these real time parameters, criteria and/or data available correlations the ground team will then select the locations suitable for rain induction and perform on site accurate particulate seeder dispersion from a device mounted on the same UAV within the eligible clouds.

The set of devices is described as follows (FIGS. 1-4):

A particulate dispersion seeder unit capable to carry up to 4,000 grams of particulates of the eligible compounds consisting of a (1) compressed gas tank, (2) a control valve, (3) container for the particulates, (4) a particulate and gas raiser tube and (5) a dispersion nozzle. The particulate dispersion seeder is a continuous release device which will work employing a flow of compressed air through a deposit containing the eligible micro or nano structured compounds and a suitable double nozzle.

A hygrometer device to measure the cloud humidity employing hygrometric compact electronics with short range wireless communication instruments and protocols. Eligible electric/electronic hygrometers include capacitive humidity sensors, resistive humidity sensors, or thermal conductivity humidity sensors.

A digital thermometer to accurately measure cloud atmospheric temperature employing thermocouples or thermistors with the capability to short range wireless communication instruments and protocols.

A wire barometer to accurately measure atmospheric pressure employing electronic circuits and devices capable of short range wireless communication instruments and protocols.

A digital ultrasonic anemometer to accurately measure wind velocity employing electronic methods and devices capable of short range wireless communication instruments and protocols.

A rotary direction video/photo camera enabled to produce a 3D visual register at any desired point within atmosphere or cloud formations.

A satellite cellular phone for the overall communication between the set of instruments in the UAV and the computer, and the team at the ground station.

A small 2"×2"×1.5" sized computer having at least four USB ports, a microSD card, camera and micro HDMI connection and WIFI via USB, linux/debian software and a GBIO bus. This computer will concentrate all short range communications employing Bluetooth or other protocol. The computer, hygrometer, thermometer, barometer and the controllers for the anemometer and the seeder device are to be mounted in a data acquisition and control unit. The sensors or the barometer and the hygrometer are located below this unit to minimize the effects of the wind flow from the UAV.

An unmanned aerial vehicle UAV device capable of airborne carrying the data acquisition and control station including the thermometer, hygrometer, as well as the controllers of the barometer, anemometer and the particulate dispersion seeder. All this set to monitor the relevant internal cloud parameters and procedures and hardware/software to communicate with a decision making meteorological ground operating team. Also this UAV device will be habilitated to release the suitable particulate materials into the selected sites of the clouds.

The UAV considered in this invention can be a four or eight helix drone capable to carry the weight of all the devices described above, having reliable static or dynamic positioning at given GPS coordinates and abled follow a given trajectory from the ground station.

Employing a mobile laboratory the ground team will monitor the data produced by the instruments carried by the UAV and to select the locations suitable for rain induction and perform the particulate dispersion from a device mounted on the same UAV. The mobile laboratory has a crew formed by driver, meteorology and electronic/IT technicians and a satellite cellular phone, a server with big data capabilities and wide screen monitors.

The criteria for data acquisition, diagnosis and decision making are the following:

Two groups of decision making criteria are considered for the practical applications this invention.

Figure 5:
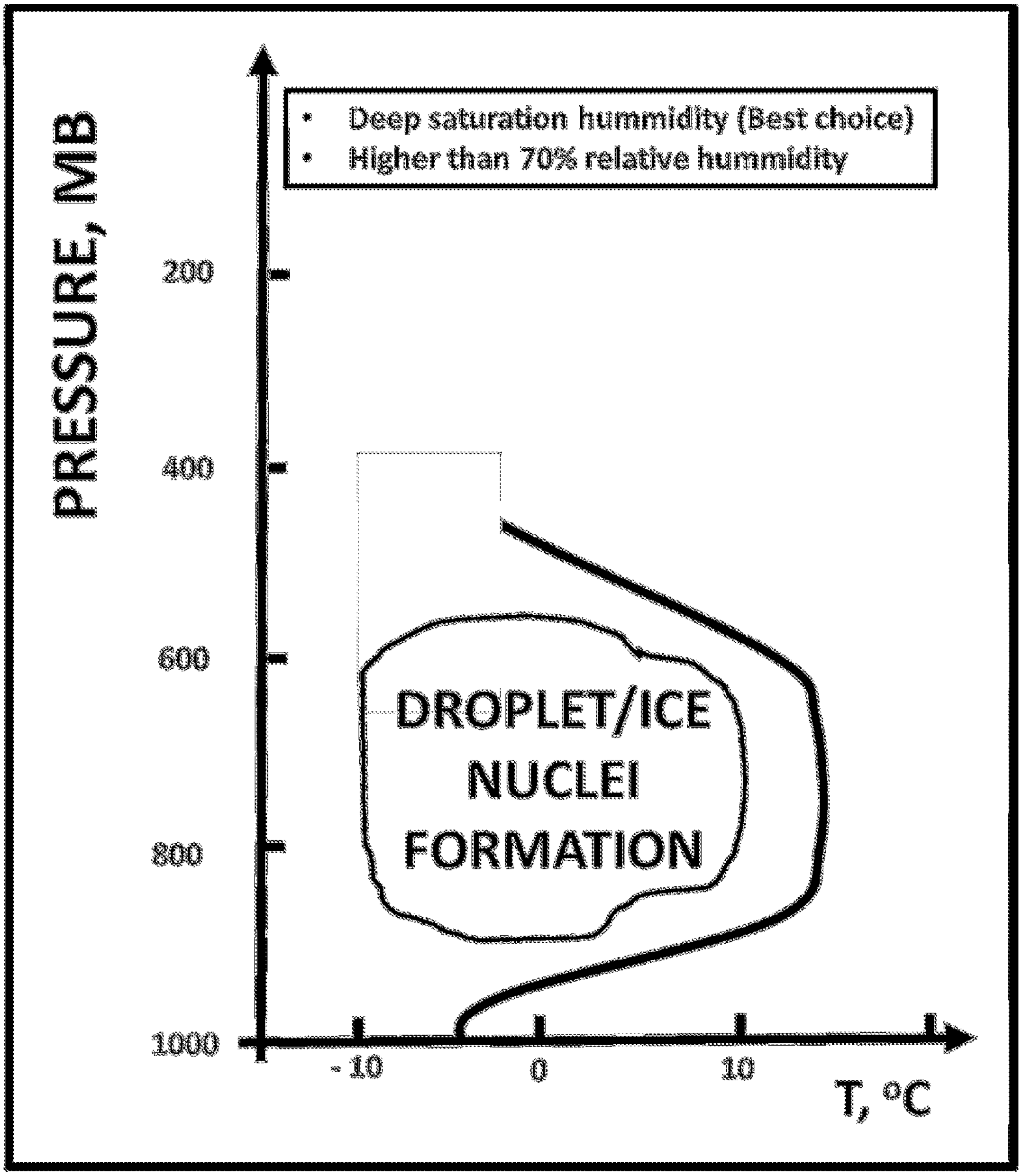
FIG. 5. Example of a graph of a typical area of barometric pressure and cloud temperatures eligible for a context of cloud seeding, provided the humidity conditions are adequate.

Group 1 considers data acquisition, diagnosis and decision criteria aimed to gather the basic meteorological information to search, select and establish the volumes within the clouds of high likelihood of nuclei formation by seeding. The criteria of Group 1 comprise technical expertise to diagnose the likelihood for the formation of liquid or ice nuclei, which ultimately will induce rain. Basically Group 1 will process the meteorological readings and define the volumes in the clouds where water saturation, temperature and barometric pressure are prone for supercritical ice particles or droplets are formed. Typically it is based in the following criteria (FIG. 5):

Cloud type priorities: (1) Nimbostratus, (2) Cumulus and (3) Cumulonimbus.

Height: Below 3,000 m

Humidity: Preferably deep saturation, but could be as low as 70% relative humidity.

Temperature: Lower than 10 C, better in the range −10 C to 5 C.

Barometric pressure: Between 500 and 1,000 MB. As described in FIG. 5.

Group 2 considers data processing capabilities and the fundamental criteria for the operations of the controllers aimed to create smart seeding trajectories and particle dispersion controls designed to perform the seeding procedures. The cloud volume to be seeded is to be 3D mapped based on information gathered by the Group 1 activities. The eligible volume will then be sliced in layers between 50 to 200 m height. The seeding process in programmed to begin from the lower XY slice and to move upwards after each slice is competed. Each XY slice is to be mapped with a tube like trajectory where the tube diameter is similar to the spraying diameter of the seeder nozzles. The tube like trajectory will optimize full coverage to the given XY layer with minimum overall displacement.

More than one seeding devices may be required in order to complete the tasks as programmed

REFERENCES

1. Daniel Rosenfeld and William L. Woodley, 1993: Effects of Cloud Seeding in West Texas: Additional Results and New Insights. J. Appl. Meteor., 32, 1848-1866. doi:http://dx.doi.org/10.1175/1520-0450(1993)032<1848:EOCSIW>2.0.CO:2
2. G. K. Mather, D. E. Terblanche, F. E. Steffens, and L. Fletcher, 1997: Results of the South African Cloud-Seeding Experiments Using Hygroscopic Flares. J. Appl. Meteor., 36, 1433-1447. doi: http://dx.doi.org/10.1175/1520-0450(1997)036<1433:ROTSAC>2.0.CO:2
3. A. Gagin and J. Neumann, 1981: The Second Israeli Randomized Cloud Seeding Experiment: Evaluation of the Results. J. Appl. Meteor., 20, 1301-1311. doi: http://dx.doi.org/10.1175/1520-0450(1981)020<1301:TSIRCS>2.0.CO:2
4. Roelof T. Bruintjes, 1999: A Review of Cloud Seeding Experiments to Enhance Precipitation and Some New Prospects. Bull. Amer. Meteor. Soc., 80, 805-820. doi: http://dx.doi.org/10.1175/1520-0477(1999)080<0805: AROCSE>2.0.CO:2

5. Douglas Schneider and Michael Moneypenny, 2002 the mesoscale seeder-feeder mechanism: its forecast implications, Volume 26 Numbers 1, 2. National Weather Digest. 45-52.

6. Omar Baddour and Roy M. Rasmussen. Microphysical observations in winter storms over the Atlas Mountains in Morocco. Atmospheric Research. Volume 24, Issues 1-4, December 1989, Pages 103-122.

7. William L. Woodley, Daniel Rosenfeld, and Bernard A. Silverman, 2003: Results of On-Top Glaciogenic Cloud Seeding in Thailand. Part I: The Demonstration Experiment. J. Appl. Meteor., 42, 920-938.doi: http://dx.doi.org/10.1175/15200450(2003)042<0920:ROOGCS>2.0.CO;2.

8. Terry W. Krauss, Roelof T. Bruintjes and Hugo Martinez. 2000 A new hail suppression project using aircraft seeding in Argentina. Journal of Weather Modification. Vol. 32. Pp. 73-80.

The invention claimed is:

1. An apparatus for performing rain induction by intelligent particle seeding within cloud formations, comprising:

an unmanned aerial vehicle having a continuous release particle storage and dispersion unit which employs a flow of compressed air through a reservoir containing eligible micro- or nano-structured compounds and a double nozzle, which is located at the top of a data acquisition and control unit instrumented with a hygrometer that measures cloud moisture, a digital thermometer that measures atmospheric cloud temperature using thermocouples or thermistors, a barometer/altimeter that measures atmospheric pressure;

a plurality of coordinate recording and viewing devices in three dimensions for accurately scrutinizing the meteorological properties from within the clouds and their surroundings; and an anemometer that measures wind speed.

2. The apparatus for performing rain induction by intelligent particle seeding within cloud formations, according to claim 1, characterized in that the particle storage and dispersion unit carries up to 4000 grams of particles preferably of sodium chloride, silver iodide, and/or potassium chloride.

3. The apparatus for performing rain induction by intelligent particle seeding within cloud formations, according to claim 1, characterized in that the particle storage and dispersion unit comprises a compressed gas tank, a control valve, a container for the particles, a gas riser tube and a dispersion nozzle.

4. The apparatus for performing rain induction by intelligent particle seeding within cloud formations, according to claim 1, characterized in that eligible electrically/electronically hygrometers include capacitive moisture sensors, resistive moisture sensors or conductivity moisture sensors thermal.

5. The apparatus for performing rain induction by intelligent particle seeding within cloud formations, according to claim 1, characterized in that the hygrometer, the digital thermometer, the wire barometer and the anemometer use electronic circuits and devices capable of using instruments and short-range wireless communication protocols.

6. The apparatus for performing rain induction by intelligent particle seeding within cloud formations, according to claim 1, characterized in that the devices for coordinate recording and three-dimensional view (40) comprise a video/photo camera rotating direction enabled to produce a 3D visual record at any desired point within the formations of the atmosphere or cloud.

7. The apparatus for performing rain induction by intelligent particle seeding within cloud formations, according to claim 1, characterized in that the unmanned aerial vehicle is in communication with a mobile laboratory with ground equipment, which monitors the data produced by the instruments transported by the UAV, selects the suitable places for the induction of rain and performs the dispersion of particles of a device mounted on the same UAV.

* * * * *